April 21, 1959 M. J. ERISMAN 2,883,035
IMPACT LOADING SECTION FOR BELT CONVEYORS
Filed July 5, 1957 2 Sheets-Sheet 1
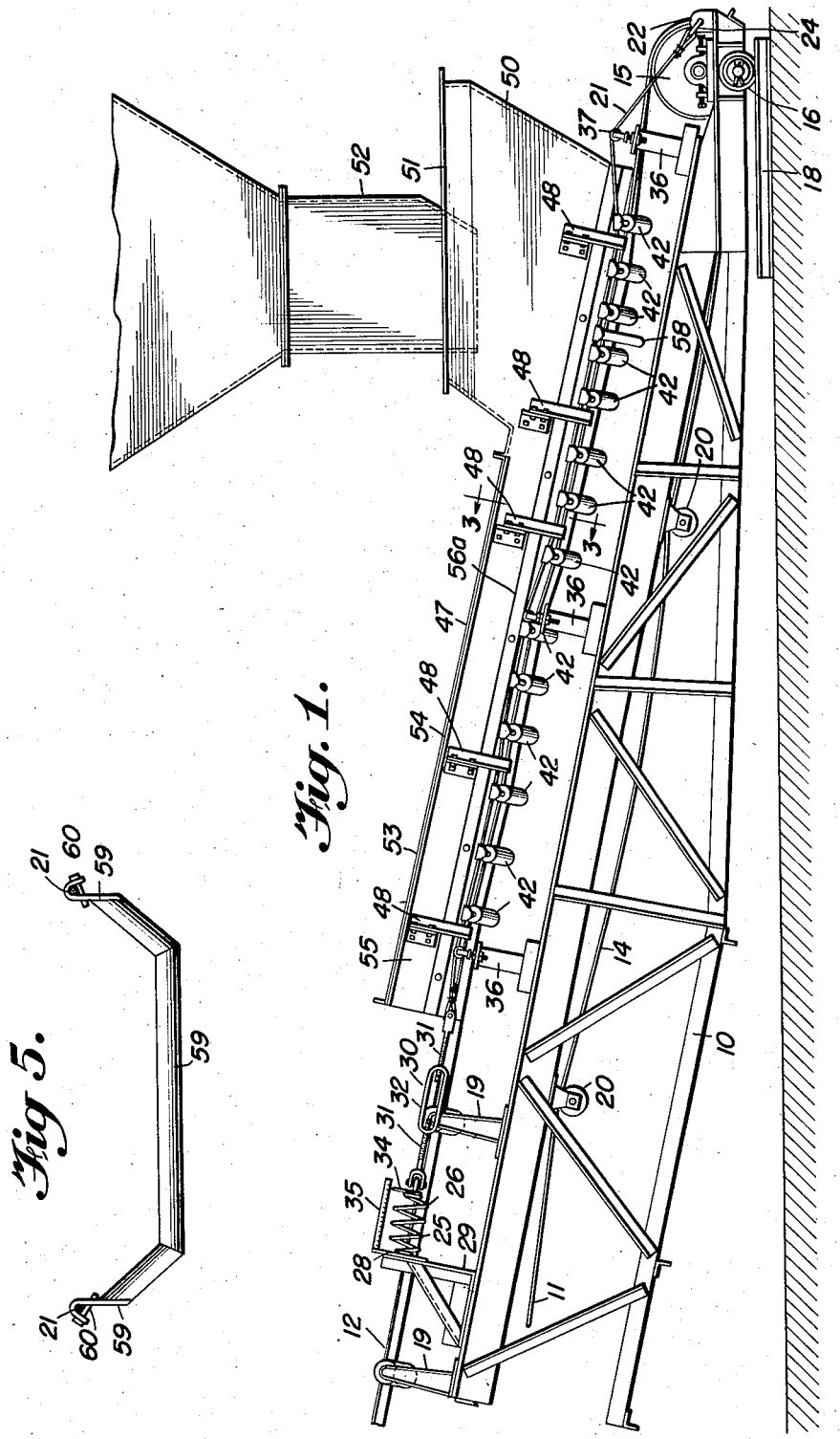

April 21, 1959
M. J. ERISMAN
2,883,035
IMPACT LOADING SECTION FOR BELT CONVEYORS
Filed July 5, 1957
2 Sheets-Sheet 2
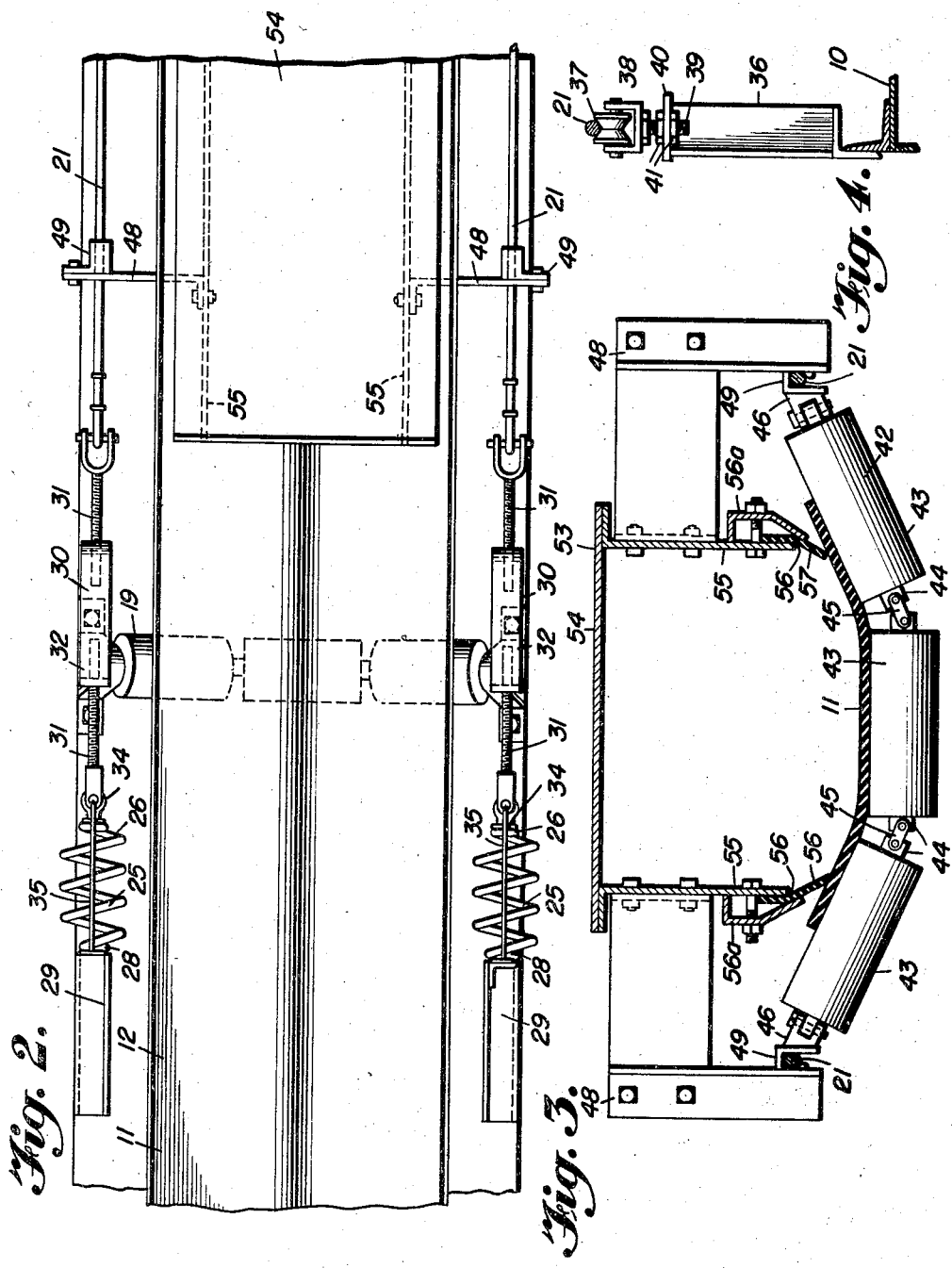

United States Patent Office 2,883,035
Patented Apr. 21, 1959

2,883,035

IMPACT LOADING SECTION FOR BELT CONVEYORS

Maurice J. Erisman, Oak Park, Ill., assignor to Link-Belt Company, a corporation of Illinois Application July 5, 1957, Serial No. 670,187

14 Claims. (Cl. 198—56)

This invention relates to new and useful improvements in belt conveyors and deals more particularly with the construction of a loading section for such conveyors which absorbs the impact attendant loading of large or heavy objects onto the conveyor belt.

In respect to belt conveyors, it is well known that a large percentage of the wear or damage to the surface of the belt occurs at the point of loading. Throughout the major portion of the active, or load-carrying, run of the conveyor the conveyed material remains stationary with respect to the belt and, therefore, has little abrasive, cutting or other detrimental effect thereon. At the loading point or section, however, the material may be dropped onto the conveyor with considerable force resulting in damage to the belt from sharp or heavy pieces.

In conventional conveyors, damage to the belt at the loading section occurs as a result of the belt passing over the idler rolls. This is due to the fact that such rolls usually are rigidly mounted and form a solid backing for the belt passing thereover. Thus the full impact of the received load is absorbed directly by the belt at these points.

One method of partially overcoming the problem presented has been to form the idler rolls at the loading section from a resilient material which absorbs part of the impact load. But this method is not entirely satisfactory or effective in all cases.

A primary object of this invention is to provide a belt conveyor having a loading section in which the idler rolls are resiliently movable so as to absorb impacts from heavy loads or objects received by the belt passing thereover.

Another object of this invention is to provide a belt conveyor having idler rolls at the loading station suspended between tension biased side cables, the bias tension in the side cables being adjustable and measurable to allow the resulting resiliency of the rolls to be set in accordance with the nature of the material being handled or other operating conditions.

Another object of this invention is to provide a loading section of the foregoing type having a feed hopper for receiving material from a source of supply and distributing it onto the belt, the hopper being mounted on the side cables carrying the idler rolls so as to partake of the yielding motion of the rolls and being formed to provide and maintain a material retaining seal between itself and the belt despite slight relative movement therebetween.

Another object of the invention is to provide a mounting bracket for the feed hopper which allows the hopper to be quickly and easily placed on or removed from the conveyor.

A further object of the invention is to provide support standards for the side cables by means of which the height of the cables relative to the conveyor frame may be adjusted.

Other objects and advantages of the invention will be apparent during the course of the following description.

In the accompanying drawings forming a part of this specification and in which like numerals are employed to designate like parts throughout the same, Figure 1 is a side elevational view of the receiving section of a belt conveyor embodying the present invention, Figure 2 is a top plan view of a portion of the structure illustrated in Fig. 1, Figure 3 is a sectional view taken on line 3—3 of Fig. 1, Figure 4 is an end elevational view of a standard employed for vertically supporting the side cables, and Figure 5 is a side elevational view of a spacer bar employed for maintaining the side cables in proper spaced relationship.

In the drawings, wherein for the purpose of illustration is shown the preferred embodiment of this invention, and first particularly referring to Fig. 1, there is shown the receiving section of a belt conveyor which includes an elongated frame structure 10 and an endless flexible belt 11 supported by the frame structure for movement in an active, or load carrying, run 12 and a return run 14, around and between terminal pulleys associated with the frame. Reference character 15 designates one of the terminal pulleys which is located at the receiving end of the conveyor frame 10. It is to be understood that a similar terminal pulley, not shown, is associated with the discharge end of the conveyor frame.

In the present instance, the conveyor frame 10 has been shown as being inclined and as having its rear end movably supported by wheels 16 riding on tracks 18, to permit longitudinal movement or adjustment. Included on the frame are conventional, rigidly mounted idler roll assemblies 19, which are of the type that support the major portion of the active run 12 of the belt 11. Also included are idler roll assemblies 20, spaced longitudinally of the frame beneath the active run 12, for supporting the return run 14 of the belt 11. Preferably, the assemblies 19 are troughed idlers, and the assemblies 20 flat idlers, as illustrated.

Along each longitudinal edge portion of the frame 10, which serves as the feeding section of the conveyor, there is placed a flexible tension member, such as a wire rope or cable 21. As best shown by Figs. 1 and 2, the cables 21 are disposed in spaced parallel relationship with the side edges of the active run of the belt 11.

In order to retain the cables 21 in place, and to allow tension to be applied thereto, means are provided for fixing one end of each cable relative to the conveyor frame. In the present instance, this means comprises apertured lugs 22 rigidly fastened to the receiving end of the conveyor frame. The corresponding end of each cable 21 is formed into a loop and connected to its lug 22 by means of a ring or clevis 24.

The other end of each cable 21 is connected to biasing means which applies a yieldable tension force to the cable. This biased tension allows each cable to resiliently yield under the action of a force applied normal to its length. In the present instance the biasing means is shown to comprise a helical spring 25 having one end 26 connected to the adjacent end of its associated cable. The other end 28 of the spring is fixed relative to the frame by connection to a bracket 29 rigidly attached to the frame.

In order to permit adjustment of the spring elongation, and consequently the tension applied to its cable 21, a turnbuckle 30 is interposed between the cable and its associated spring, and includes two members 31 threaded into a common sleeve 32. Rotating the sleeve 32 relative to the members 31 shortens or lengthens the distance between the ends of the turnbuckle, and consequently lengthens or shortens, respectively, the spring elongation, depending on the direction of rotation of the sleeve 32.

To allow the spring elongation, and consequently the force exerted by the spring 25, to be measured, a pointer 34 is fixed relative to one end of each of the springs. A graduated scale 35, positioned parallel to the longitudinal axis of the spring and in close proximity to the pointer, is fixed relative to the other end of the spring. Thus, the spring elongation may be measured by observing the position of the pointer relative to the graduations of the scale.

Depending on the length of the cables 21, and on the means employed for fixing and biasing them, spaced standards 36, connected to the frame 10, may be employed for vertically supporting the cables 21 at spaced points along their lengths. On the top portion of each standard 36 is a grooved roller 37, as shown best in Fig. 4, which serves to engage the cable and to allow longitudinal movement of the cable over the standard. Preferably, each standard 36 includes means for adjusting the height of the pulley 37 in respect to the frame 10 to which the standard is connected. In the embodiment shown, this means is effected by providing a forked member 38 between the arms of which the pulley 37 is mounted in a conventional manner. Connected to the member 38 is a threaded stem 39 fitted through an apertured plate 40 in the top portion of the standard 36. Opposed clamping nuts 41 threaded unto the stem 39 and lying on opposite sides of the plate 40 are employed to secure the stem to the standard 36. It will be evident that the pulley 37 may be raised or lowered relative to the remainder of the standard 36 by advancing the nuts 41 in one direction or the other along the stem 39.

A plurality of longitudinally spaced, troughed idler roll assemblies 42 are suspended from and between the side cables 21 normal to the longitudinal axis of the belt 11. As shown in Figure 3, these assemblies may comprise three rolls 43, placed end to end, each rotatable about a separate shaft 44. Each end of the middle shaft is connected to the inner end of the adjacent shaft by means of a link 45 pin connected to each of the two shafts, or by any other suitable means for forming a hinged joint. Connected to each of the two outer ends of the shafts 44 are hooked members 46 adapted to fit over the cables 21.

The height of the cables relative to the frame 10 is adjusted so that the idler roll assemblies 42 underlie the belt 11 and support it, under operating conditions, at a height substantially equivalent to the height at which it is supported by the rigid idlers 19. Since it is evident, however, that the idlers 42 will move downward to some extent as the belt is loaded, it is desirable that they be positioned, under load free conditions, at a height somewhat greater than the height of the rigid idlers in order to compensate for this downward movement.

Considering the structure described so far, it will be seen that impact loads applied to the belt 11 at the feed portion of the active run 12 will be transmitted through the suspended idler assemblies 42 to the side cables 21, and from the cables to the springs 25, causing an elongation thereof. The elongative movement of the spring in return causes the cables 21 to sag between the standards 36. The idler assemblies connected to the cables 21 partake of this sagging movement and consequently lower the belt 11 supported thereon. It will be appreciated, of course, that the application of the impact load to the belt and the resultant movement of the belt away from the load are virtually simultaneous occurrences, and also that the impact loads exerted on the belt 11 are absorbed as work in the spring. The idler roll assemblies 42 thus provide a support for the belt which cushions impact loads applied thereon by resiliently moving away from the load as it is applied.

In order to properly distribute the conveyed material onto the active run 12 a loading hopper 47 may be employed. Preferably, this hopper is mounted, by supporting means, on the cables 21 so as to partake of the movement thereof and thereby follow the vertical movement of the belt surface. In the present embodiment the supporting means comprises a plurality of laterally extending brackets 48, attached to the hopper 47, having downwardly opened slotted members 49 for engaging the cables 21. It will be noted that this particular construction allows the hopper 47 to be placed on or removed from the conveyor without the necessity of making or breaking any mechanical connections.

As shown in Figs. 1 and 3, the hopper 47 is open bottomed and includes a feed portion 50 provided with an opening 51 for receiving material from a means of supply, such as stationary hopper 52. In the present embodiment the loading hopper also includes an elongated forward portion 53 provided with a cover 54 to confine dust raised from the material by the loading operation. The sides 55 of the loading hopper are symmetrically disposed about the longitudinal axis of the belt 11, and are formed with straight bottom edges 56 disposed in closely spaced parallel relationship with the belt within the vertical projections of the edges of said belt.

In order to form a material retaining seal between the hopper and the belt, a flexible sealing strip 57 may be attached along and adjacent to the bottom edge 56 of each of the sides 55 by means of a longitudinal clamping member 56a of said loading hopper. As shown in Fig. 3, the strip 57 extends downwardly and inwardly into contact with the belt 11 and is held in a slightly deformed condition by the belt so that contact between the belt and the strip will be maintained, by flexure of the strip, despite slight relative vertical movement between the hopper and the belt.

Referring to Fig. 1, it will be apparent that the greatest impact loads occur on that portion of the active run directly beneath the feed portion 50 of the loading hopper, and, that little resilient movement of the idler assemblies 42 is obtained when the assemblies are connected to the cables 21 in close proximity to the standards 36. It is therefore desirable that the stretch of cable paralleling the feed portion 50 be free and vertically unsupported so that maximum resilient movement of the idler assemblies can be had at this point of maximum impact. For this reason, in the present device, one standard 36 is positioned behind the feed portion 50 of the hopper with the next adjacent standard being located ahead of the feed portion. To maintain the proper lateral spacing of the two side cables 21 throughout this particular stretch a spacer bar 58 connected between the two cables may be required. As shown in Fig. 5, the bar 58 may be constructed as a U-shaped weldment of pipe provided at each end with hooked members 59 adapted to fit over the cables 21, the members 59 being provided with through pins 60 for retaining the bar on the cables.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A belt conveyor comprising an elongated rigid frame, an endless belt disposed along said frame for movement through active and return runs, spaced idler roll assemblies rigidly mounted to said frame for supporting a major portion of said active and return runs, a flexible member disposed in spaced parallel relationship with each side edge of a minor portion of the active run of said belt, said minor portion being unsupported throughout its length by any of said rigidly mounted idler roll assemblies, means for fixing one end of said member relative to said frame, biasing means connecting the other end of said flexible member to said frame for applying a yieldable tension force to said member to permit the latter to resiliently yield under the action of a force applied normal to its length, and a plurality of idler roll assemblies spaced longitudinally of and connected at their outer ends to said yieldably biased flexible members in underlying relationship with the active run of said belt so as to form a resilient support for said minor portion thereof.

2. A belt conveyor as defined in claim 1 further characterized by said biasing means comprising a spring.

3. A belt conveyor as defined in claim 1 further characterized by said biasing means comprising a helical spring having one end connected to said flexible member and its second end fixed relative to said frame.

4. A belt conveyor as defined in claim 3 further characterized by a pointer fixed to the movable end of said spring, and a graduated scale fixed relative to the stationary end of said spring, said scale being positioned relative to said pointer so that the elongation of said spring will be measured by the position of said pointer relative to the graduations of said scale.

5. A belt conveyor as defined in claim 3 further characterized by a turnbuckle connected between said flexible member and said spring to permit adjustment of the initial tension applied to said flexible member.

6. A belt conveyor comprising an elongated rigid frame, an endless belt disposed along said frame for movement through active and return runs, spaced idler roll assemblies rigidly mounted to said frame for supporting a major portion of said active and return runs, a flexible member disposed in spaced parallel relationship with each side edge of a minor portion of the active run of said belt, said minor portion being unsupported throughout its length by any of said rigidly mounted idler roll assemblies, means for vertically supporting said flexible member at points spaced along its length, means for fastening one end of said tension member to said frame, biasing means connecting the other end of said flexible member to said frame for applying a yieldable tension force to said member so that the latter is stretched between said vertical support means so as to be capable of resiliently yielding under the action of a force applied normal to its length, and a plurality of idler roll assemblies spaced longitudinally of and connected at their outer ends to said flexible members in underlying relationship with the active run of said belt so as to form a resilient support for said minor portion thereof.

7. A belt conveyor as defined by claim 6 further characterized by said means for vertically supporting said flexible member at points spaced along its length comprising standards connected to said frame, each of said standards including a grooved pulley at its top portion for engaging said flexible member, and means for adjusting the height of said pulley in respect to said frame.

8. A belt conveyor as defined by claim 7 further characterized by said biasing means comprising a helical spring having one end fixed to said frame, and a turnbuckle for adjusting the initial tension in said flexible member having one end connected to said spring and its other end connected to said flexible member.

9. A belt conveyor comprising an elongated frame, an endless belt supported by said frame for movement through active and return runs, two flexible members straddling a longitudinal portion of the active run of said belt, means for fastening one end of each of said flexible members to said frame, means for applying a biasing force to the other end of each of said flexible members to yieldingly stretch said members along said longitudinal portion, a plurality of spaced idler roll assemblies connected at their outer ends to said two flexible members in supporting relationship with said belt so as to form a resilient movable support for the latter, an open-bottomed loading hopper overlying said longitudinal portion of said active run, and means for supporting said hopper on said flexible tension members so as to partake of the movement of the latter.

10. A belt conveyor as defined in claim 9 further characterized by said loading hopper having two sides symmetrically disposed about the longitudinal axis of said belt, the bottom edges of said two sides being disposed in closely spaced parallel relationship with said belt within the vertical projections of the the edges of the latter, and by said means for supporting said hopper comprising a plurality of laterally extending brackets connected to each of said two sides, each of said brackets having downwardly opened slots for engaging said flexible members.

11. A belt conveyor as defined in claim 10 further characterized by a strip of flexible material fastened along the bottom edge of each of the sides of said loading hopper, said flexible sealing strip extending into contact with said belt despite slight relative vertical movement between said hopper and said belt.

12. A belt conveyor comprising an elongated frame, an endless belt supported by said frame for movement through active and return runs, two flexible members straddling a longitudinal portion of the active run of said belt, an open-bottomed loading hopper supported on said flexible members and disposed in overlying relationship with said longitudinal portion of said active run, said loading hopper having a supply portion provided with an intake opening for receiving material from an associated material supply means, each of said flexible members being supported by a plurality of spaced standards connected to said frame, said plurality of standards including a first standard positioned to support its associated flexible member at a point behind said supply portion of said hopper, and a second standard next adjacent said first standard positioned to support said flexible member at a point ahead of said supply portion so as to leave a vertically unsupported stretch of said flexible member opposite said supply portion of said hopper, means for fixing one end of each of said flexible members relative to said frame, biasing means connecting the other end of each of said flexible members to said frame for applying a yieldable tension force to said members, and a plurality of spaced idler roll assemblies connected at their outer ends to said two flexible members, said idler assemblies being positioned in supporting relationship with said belt so as to form a resilient support for the latter.

13. A belt conveyor as defined in claim 12 further characterized by a rigid spacer bar connected at its outer ends to said two flexible members, said spacer bar being located beneath said supply portion of said hopper between said first and second standards.

14. A belt conveyor as defined in claim 12 further characterized by said biasing means comprising a helical spring associated with each of said flexible members, said helical spring having one end connected to said flexible member and its other end fixed relative to said frame.

References Cited in the file of this patent
UNITED STATES PATENTS

| | | |
|---|---|---|
| 2,564,680 | Faller | Aug. 21, 1951 |
| 2,732,930 | Thompson | Jan. 31, 1956 |
| 2,773,257 | Craggs et al. | Dec. 4, 1956 |